Nov. 1, 1960    J. E. ASHWORTH    2,958,493
COIL CARRIER WITH PNEUMATIC COIL SUPPORT
Filed Feb. 2, 1959
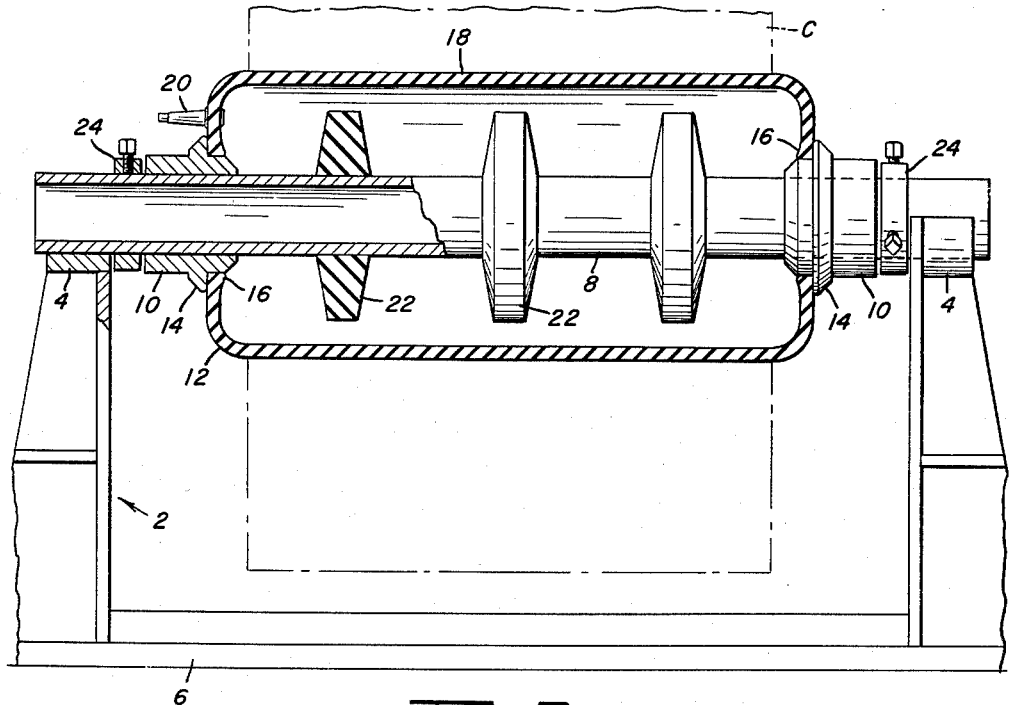
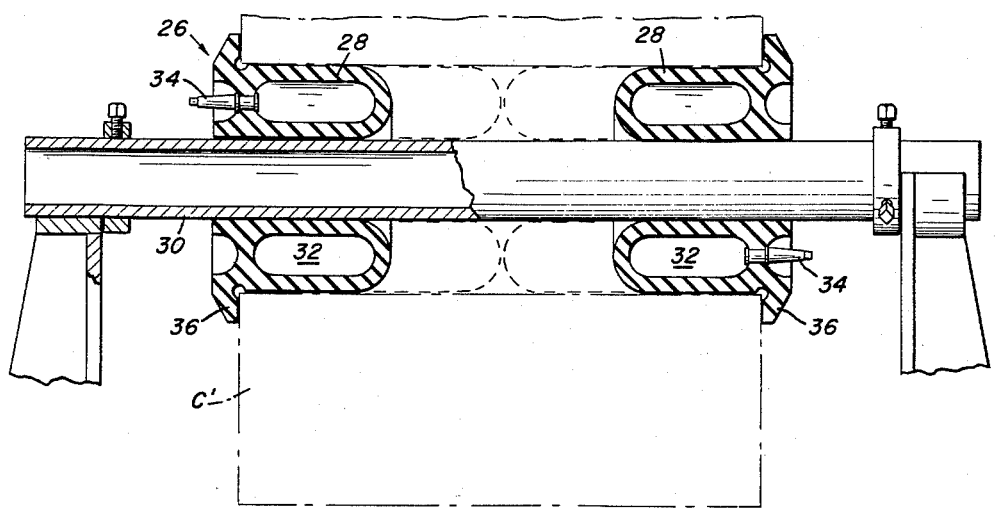
INVENTOR
JAMES E. ASHWORTH
By Donald G. Dalton
Attorney

United States Patent Office 2,958,493
Patented Nov. 1, 1960

2,958,493

COIL CARRIER WITH PNEUMATIC COIL SUPPORT

James E. Ashworth, Palo Alto, Calif., assignor to United States Steel Corporation, a corporation of New Jersey Filed Feb. 2, 1959, Ser. No. 790,488

2 Claims. (Cl. 248—119)

The present invention relates to apparatus for handling articles and more particularly has as its primary object the provision of an improved carrier apparatus for handling bundles of coiled material.

Another object of the invention is to provide an improved carrier handling apparatus which includes a pneumatic carrier support.

A further object of the invention is to provide a pneumatic coil carrier which is readily adjustable to accommodate various size bundles of coiled material.

Still another object of the invention is to provide a pneumatic coil carrier which is capable of quick and easy loading and which is relatively simple and inexpensive to manufacture.

These and other objects will become more apparent after referring to the following specification and attached drawings, in which:

Figure 1 is a longitudinal sectional view; and

Figure 2 is a view similar to Figure 1 of a modified embodiment of the invention.

Referring now to Figure 1, reference numeral 2 designates the coil cradle of the invention which includes two spaced upright bearings 4 mounted on a base 6. Reference numeral 8 designates the shaft or mandrel of the invention which may be made in the form of a light weight, high strength metal tube adapted to be supported on the upright bearings 4. Spaced collars or rims 10 are circumferentially disposed on the shaft 8 for mounting an expansible sleeve or tube 12 on the shaft 8. Each of the collars 10 is formed with a circumferential flange 14 which forms an inner seat on the collar for receiving the beads 16 of tube 12.

Tube 12 is preferably constructed of a ply-fabric having beads 16 at its inner edges. The outer circumference or tread 18 of the tube 12 may be smooth or rough as preferred. A valve inlet 20 is provided in the tube 12 for the passage of pressurized air into and out of the tube for inflating and deflating it.

Rings 22 of resilient material are spaced along the shaft 8 inside the tube 12 and function to limit the collapse of the tube when it is deflated. Rings 22 prevent complete collapse of the tube and so eliminate the danger of breakage occurring in the tube body.

The beads 16 of the tube 12 may be sealed on the mounting rims 10 so as to make the tube airtight.

In operation, the shaft 8 with the tube 12 mounted thereon in deflated condition is fitted into the eye of a coil C of strip material which is to be transported. After the shaft and tube have been thus inserted into the coil the tube 12 is inflated so that the tread 18 thereof engages and supports the inner circumference of the coil. The shaft 8 is then seated in the bearings 4 by means of an overhead crane, fork lift truck, or similar means. The cradle 2 is rigidly mounted on the floor of a carrier such as a gondola, highway truck, or other transport vehicle.

Adjustable collars 24 are mounted on the shaft 8 adjacent the inside of each of the upright bearings 4 so as to prevent lateral displacement of the shaft 8 in the cradle 2.

After the coil arrives at its destination the shaft 8 with the carrier thereon is removed from the cradle 2 and the tube 12 is deflated so that the mandrel tube can be removed from the coil.

The cushion of air provided by the inflated tube 12 upon which the carrier rests during transportation minimizes shock to the coil caused by transportation movements thereby reducing the possibility of damage due to vibration. The cradle mounting for the pneumatically supported coil prevents marring and edge damage to the coil.

Referring now to Figure 2, reference numeral 26 designates generally a modified embodiment of my invention. In this form of my invention the expansible sleeve or tube is in the form of a pair of expansible annular seats 28 slidable on a shaft or mandrel 30. Each of the seats 28 is provided with a continuous air chamber 32 provided with a valved inlet 34 whereby the air chamber can be inflated or deflated. An annular flange 36 is provided around the outside of each of the seats 28 having a purpose which will become apparent.

In operation, the seats 28 are fitted into the ends of the eye of coil C'. The annular flanges 36 fit against the outside edges of the eye of the coil and function to position the seats properly. The shaft or mandrel 30 is then fitted into the center openings of the seats 28. After the seats and mandrel have been thus positioned within the coil the air chambers in each of the seats is inflated by means of the valved inlet 34. Inflation of the chambers 32 causes them to project inwardly of the eye of coil C', as shown by broken lines, with their outer circumferences positively engaging the inner circumference of the coil and their inner circumference positively engaging the mandrel 30 so that the coil, the seats and the mandrel are properly positioned relative to each other.

The completed assembly, after the air chambers have been inflated, is placed on the upright bearings 4 of the coil cradle 2 in the manner described above relative to the preferred embodiment of my invention.

While one embodiment of my invention has been shown and described, it will be apparent that other adaptations and modifications may be made without departing from the scope of the following claims.

I claim:

1. Apparatus for transporting a coil having a central eye extending in a horizontal plane which comprises a horizontal shaft, spaced bearings supporting said shaft, an expansible annular sleeve of resilient material surrounding said shaft, means mounting said sleeve on said shaft, said means including a pair of collars each having a circumferential flange therearound forming a seat for receiving one end of said sleeve, the ends of said sleeve being sealed in said seats, a valved inlet in said sleeve for the passage of pressurized air to and from said sleeve, said sleeve being adapted to be collapsed so as to fit removably in the eye of a coil telescoped on said shaft and, when inflated, to constitute an air cushion on which the coil rests directly, and a plurality of resilient rings spaced along the length of said shaft and extending radially therefrom in said sleeve for limiting the collapse of said sleeve when the same is deflated.

2. Apparatus for transporting a coil having a central eye extending in a horizontal plane which comprises a horizontal shaft, spaced bearings supporting said shaft, an expansible annular sleeve of resilient material surrounding said shaft, said sleeve including a pair of expansible annular seats slidable on said shaft, a valved inlet in each of said seats for the passage of pressurized air to and from said seats, said seats being adapted to be collapsed so as to fit removably in the eye of a coil telescoped on said shaft and, when inflated, to constitute an air cushion on which the coil will rest directly, said seats adapted to extend the full length of the eye of the coil, each of said seats having a radial flange at one end adapted to engage an end face of the coil when the seat is inserted in the eye of the coil.

References Cited in the file of this patent

UNITED STATES PATENTS

| | | |
|---|---|---|
| 2,145,806 | Schnedarek | Jan. 31, 1939 |
| 2,250,675 | Markle | July 29, 1941 |
| 2,520,126 | Collard | Aug. 29, 1950 |
| 2,697,563 | Miller | Dec. 21, 1954 |
| 2,876,961 | Cole | Mar. 10, 1959 |